R. S. PEASE.
METHOD OF AND APPARATUS FOR DRAWING GLASS ARTICLES.
APPLICATION FILED NOV. 9, 1911.
1,180,875.
Patented Apr. 25, 1916.
3 SHEETS—SHEET 3.
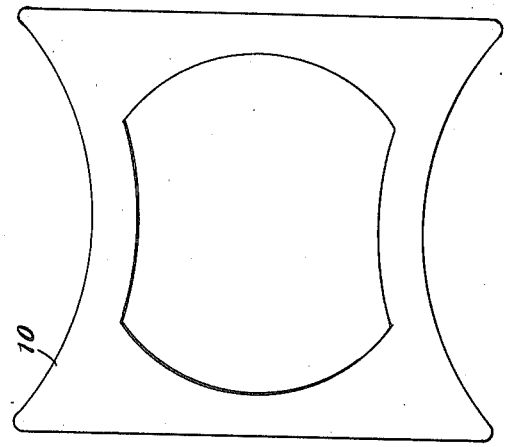
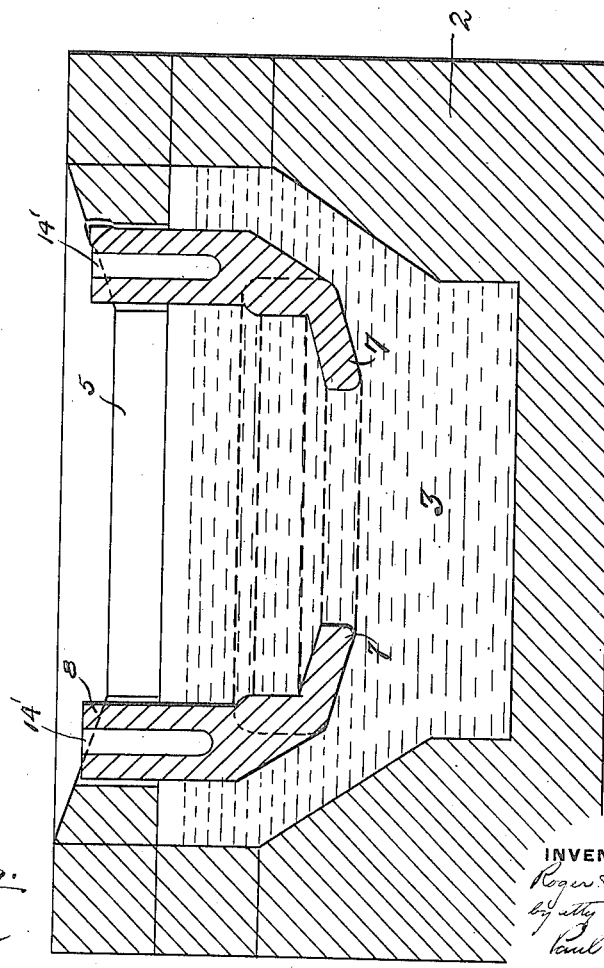

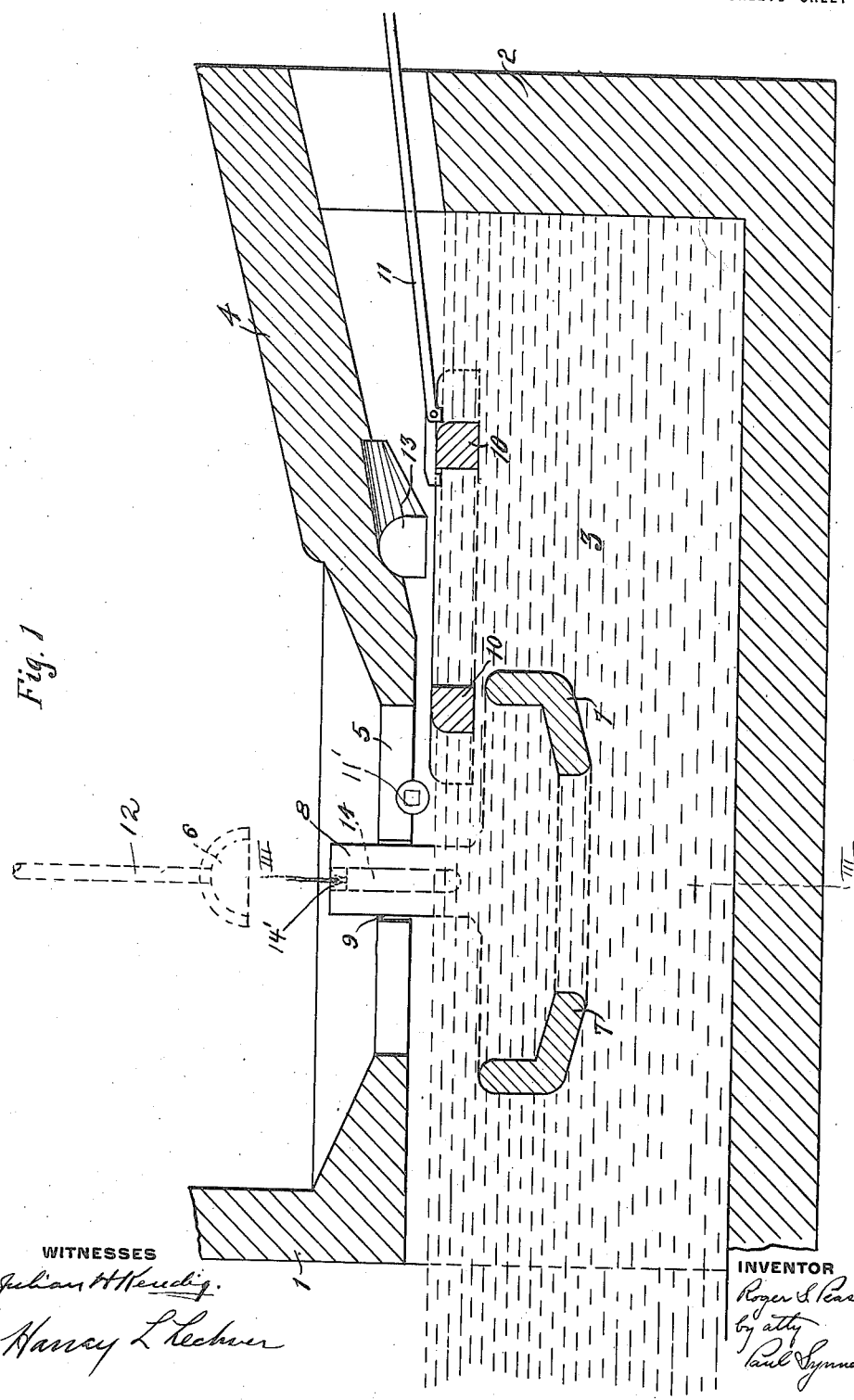

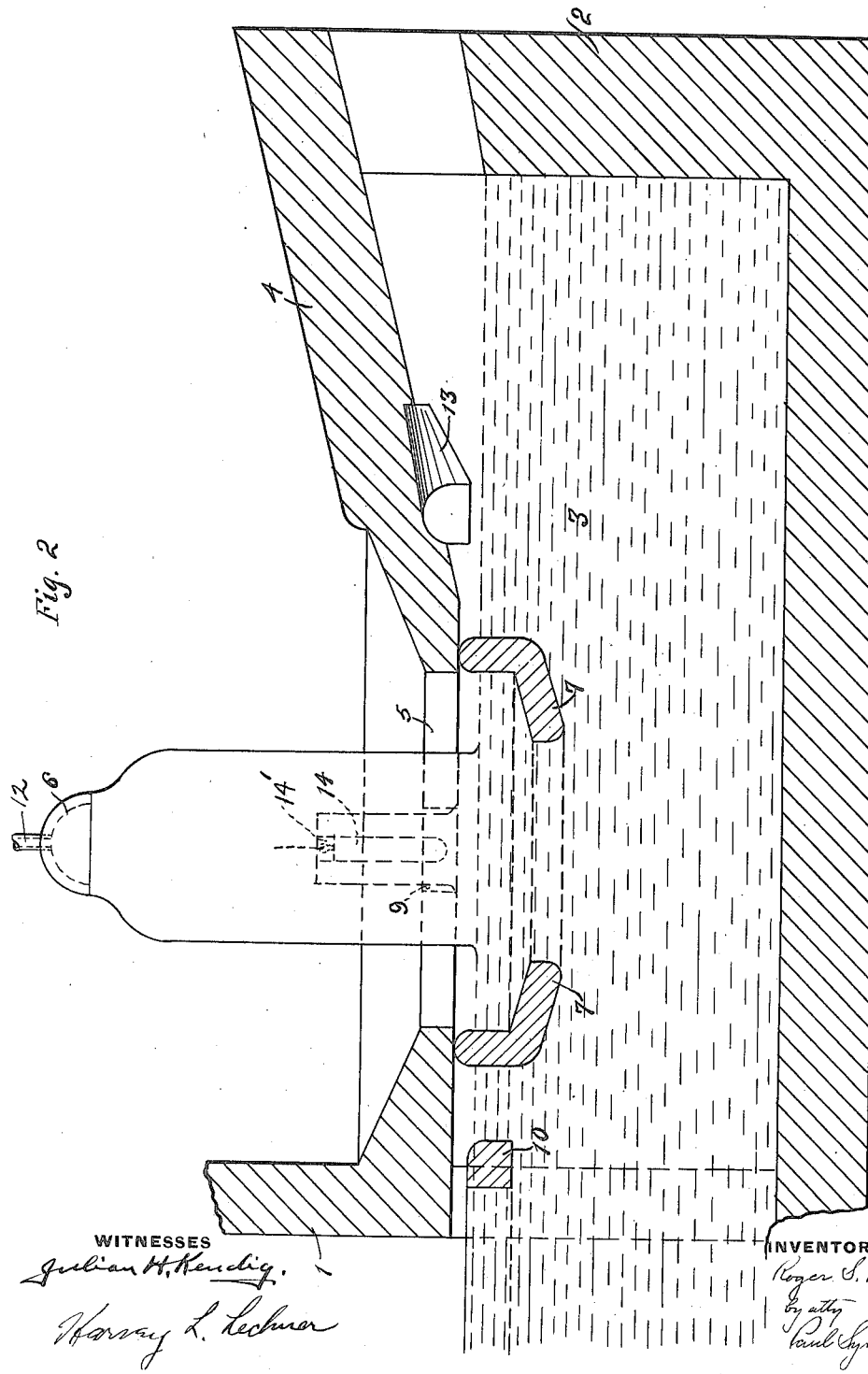

UNITED STATES PATENT OFFICE.

ROGER S. PEASE, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

METHOD OF AND APPARATUS FOR DRAWING GLASS ARTICLES.

1,180,875.  Specification of Letters Patent.  Patented Apr. 25, 1916.

Application filed November 9, 1911.  Serial No. 659,353.

*To all whom it may concern:*

Be it known that I, ROGER S. PEASE, a citizen of the United States, residing at Pittsburgh, in the county of Allegheny and State of Pennsylvania, have invented certain new and useful Improvements in Methods of and Apparatus for Drawing Glass Articles, of which the following is a specification.

My invention has reference to a method of and apparatus for drawing glass articles from a body of molten glass, and it relates particularly to the drawing of glass cylinders for the making of window glass and the like. Among the chief objects of my invention are: the provision of an improved method of drawing glass whereby the article is drawn from the purest and best portions of the molten glass, thus reducing to a minimum breakage from imperfections arising from a poor quality of glass due to the presence of surface glass or other extraneous substance; and the provision of improved apparatus for removing surface glass or extraneous substances from that portion of the glass from which the drawing is to be done. These, together with such other objects as may hereinafter appear or are incidental to my invention I attain by means of a construction illustrated in preferred form in the accompanying drawings.

Of the drawings, Figure 1 is a longitudinal section through a dog house and portion of the glass tank of the usual glass furnace construction. Figure 2 is a section similar to that of Figure 1 showing the parts in different position; Fig. 3 is a section on the line III—III of Fig. 1 just previous to the drawing of a cylinder; and Fig. 4 is a plan of a detail of my invention. The steps employed in carrying out my improved method of drawing glass are clearly indicated in the drawings, and for convenience the apparatus will therefore be first described.

Referring particularly to Figure 1, I have diagrammatically indicated the usual glass tank 1 communicating with the dog house 2, from which the glass is to be drawn. The molten glass in the tank and dog house is indicated by the numeral 3. The top wall or roof 4 of the dog house is provided with the port or opening 5 to permit the passage of the bait 6 and the cylinder being drawn thereby. Immediately beneath the port opening 5 is a dish-shaped drawing ring 7 provided with upstanding projections or plungers 8—8 loosely fitting the guideways or openings 9—9 in the roof 4, which serves to maintain the drawing ring in proper position when it is depressed or elevated, for purposes which will hereinafter appear. Adjacent the drawing ring is a plate or disk 10 which is composed of fire clay or other refractory material of less density than the glass so that it will float thereon. The drawing ring is composed of similar material. This plate, hereinafter to be termed a "skimmer" is manipulated by means of the hooked rod 11. The bait 6 is provided with the usual blow pipe 12 and is lowered and elevated by any desired form of drawing mechanism. The surface of the glass is heated by a series of jets of the usual type, one of which is diagrammatically illustrated at 13. When not in use the rod 11 can be supported at its inner end on the bar 11' mounted in the wall of the dog-house.

The operation of the apparatus is as follows: When a cylinder is to be drawn, the drawing ring 7 is depressed by placing weights 14 in the openings 14' in the plungers 8—8 until the entire ring is submerged below the level of the body of the glass, as indicated in Fig. 1. The skimmer 10 is then moved across the submerged drawing ring by means of the handle or rod 11 and left in a position a little to one side of that indicated in dotted lines in Fig. 1. In moving the skimmer across the drawing ring, all of the surface glass remaining above the drawing ring from previous drawing operations together with any floating extraneous substance which may be detrimental to successful drawing will be carried to one side by the skimmer. The drawing ring is then permitted to rise and assume its normal floating position by lifting the weights 14. This operation leaves a portion of glass remaining in the drawing ring from which all extraneous substances have been removed, and as the drawing operation continues the glass is fed through the opening in the bottom of the ring from the deeper portion of the glass in the dog house, at which point the molten glass is in its purest condition. The edges of the ring which project above the level of the glass will prevent the impurities from finding their way in to the drawing ring. It is well known in glass manufacture that all impurities and extraneous substances rise to the surface of the glass and that the glass is purest below the surface and it will be obvious that by this arrangement the liability of any imperfection in the cylinder being drawn arising from a poor quality of glass will be reduced to a minimum, as will the breakages and loss which are a consequence thereof. After completion of the drawing operation the drawing ring is again submerged and the operation is repeated.

As will be evident from the description of the apparatus and its operation above given, my improved method of drawing glass articles comprises the following steps: the submersion of the drawing ring, the removal of all surface glass and extraneous substances in the glass above the drawing ring by moving the skimmer across the submerged drawing ring, the elevation of the drawing ring so that the main communication with the interior of the ring will be had through the opening in the bottom thereof and then the drawing of the glass by means of a bait in the usual manner.

In Figure 4 I have shown a plan view of the skimmer plate. As here shown, the plate is cut away in its central portion and has its outer edges formed on a concave curve to facilitate the skimming operation, this shape serving to entrap the impurities and carry them along.

It will be obvious to those skilled in the art that the particular means which I have shown for preparing the surface of the glass for another drawing need not necessarily be employed and that even where the glass is prepared by remelting the surface, there are advantages in submerging the drawing ring while the re-preparation is taking place. The submergence—for example—will better expose the surface to the heat action if the remnant from the last drawing is to be re-melted.

It is also to be noted that by the peculiar formation of ring employed, an action will be obtained in which the raising of the ring will itself tend to cause an outward flow of the surface glass above the ring, due to the restricted aperture in the bottom of the ring and in this manner the ring is—by its being raised and lowered—made in a sense self skimming.

Having thus described my invention and illustrated its use, what I claim as new and desire to secure by Letters Patent is the following:

1. The herein described process of drawing glass cylinders from a drawing ring floating on a body of molten glass which consists in submerging the drawing ring below the level of the body of glass from which the cylinder is to be drawn, in skimming off the portion of glass immediately above the submerged drawing ring, then in raising the drawing ring until a portion thereof projects above the level of the body of glass, and in drawing the cylinder from the glass within the drawing ring.

2. The herein described process of drawing glass cylinders from a drawing ring floating on a body of molten glass which consists in submerging the normally floating drawing ring below the level of the molten glass, then in skimming off the glass immediately above the drawing ring, then in permitting the drawing ring to assume its normal floating level, and in drawing the cylinder from the glass within the drawing ring.

3. In apparatus for drawing glass articles from a body of molten glass, the combination of a drawing ring, means for temporarily submerging the drawing ring below the level of the body of glass, a skimming means for skimming off the glass above the submerged drawing ring, and a bait for drawing the article.

4. In apparatus for drawing glass articles from a body of molten glass, the combination of a drawing ring, means for temporarily submerging the drawing ring below the level of the body of glass, a plate for skimming off the glass above the submerged drawing ring, and a bait for drawing the article.

5. In apparatus for drawing glass articles from a body of molten glass, the combination of a normally floating drawing ring, means for temporarily submerging the drawing ring below the level of the body of glass, a normally floating member for skimming off the glass above the drawing ring, means for moving said member across the submerged drawing ring, and means for drawing a glass article from the drawing ring.

6. In apparatus for drawing glass articles from a body of molten glass, the combination of a normally floating drawing ring, means for temporarily submerging the drawing ring below the level of the body of glass, guide means for maintaining the ring in position as it is being lowered and raised, means for skimming off the glass above the drawing ring when it is submerged, and means for drawing a glass article from the drawing ring.

7. In apparatus for drawing glass articles from a body of molten glass, in a tank or furnace, the combination of a normally floating drawing ring provided with a plurality of projections, guide-ways in the furnace wall through which the projections slide freely, means for temporarily submerging the drawing ring below the level of the body of glass, a skimmer for skimming off the glass above the drawing ring when it is submerged and adapted to pass over the drawing ring between the projections, and means for drawing a glass article from the ring.

8. A process for drawing glass which consists in submerging a drawing ring in a body of molten glass, permitting the glass to flow over and cover the upper edge of the ring, causing the ring to rise until its upper edge lies above the surface of the glass, drawing a glass article from the glass in the ring while such ring is in its raised position, and repeating the foregoing operations in the drawing of successive articles.

In testimony whereof I have hereunto signed my name in the presence of two subscribed witnesses.

ROGER S. PEASE.

Witnesses:
    LETITIA A. MYERS,
    DOERING BELLINGER.